United States Patent [19]

Dixit et al.

[11] Patent Number: 5,248,721

[45] Date of Patent: * Sep. 28, 1993

[54] PREPREGS CONTAINING A FIBER AND A THERMOPLASTIC POLYBENZAZOLE COPOLYMER MATRIX

[75] Inventors: Thuan P. Dixit; R. Giles Dillingham, both of Midland; O. Carl Raspor, Saginaw, all of Mich.

[73] Assignee: The Dow Chemical Company, Midland, Mich.

[*] Notice: The portion of the term of this patent subsequent to Mar. 23, 2010 has been disclaimed.

[21] Appl. No.: 668,532

[22] Filed: Mar. 13, 1991

[51] Int. Cl.⁵ .............................................. C08K 3/40
[52] U.S. Cl. .................................... 524/494; 528/179
[58] Field of Search ......................... 524/494; 528/179

[56] References Cited

U.S. PATENT DOCUMENTS

| | | | |
|---|---|---|---|
| 4,533,692 | 8/1985 | Wolfe et al. | 524/417 |
| 4,533,693 | 8/1985 | Wolfe et al. | 524/417 |
| 4,533,724 | 8/1985 | Wolfe et al. | 528/313 |
| 4,703,103 | 10/1987 | Wolfe et al. | 528/179 |
| 4,772,678 | 9/1988 | Sybert et al. | 528/179 |
| 4,996,281 | 2/1991 | So | 528/73 |

FOREIGN PATENT DOCUMENTS

0388803 9/1990 European Pat. Off.
9003995 4/1990 PCT Int'l Appl.

OTHER PUBLICATIONS

Harris et al., *Copolymers Containing Polybenzoxazole, Polybenzothiazole and Polybenzimidazole Moieties*, Ser. No. 256,338 (filed Oct. 11, 1988).

Harris et al., *Copolymers Containing Polybenzoxazole, Polybenzothiazole and Polybenzimidazole Moieties*, Ser. No. 327,925 (filed Mar. 23, 1989).

Harris et al., *Thermoplastic Compositions Containing Polybenzoxazole, Polybenzothiazole and Polybenzimidazole Moieties*, Ser. No. 327,926 (filed Mar. 23, 1989).

Harris et al. *Copolymers Containing Polybenzoxazole, Polybenzothiazole and Polybenzimidazole Moieties*, Ser. No. 407,973 (filed Sep. 15, 1989).

Harris et al., *Copolymers Containing Polybenzoxazole, Polybenzothiazole and Polybenzimidazole Moieties*, Ser No. 520,589 (filed May 8, 1990).

Harris et al. *Shaped Articles Containing Copolymers of Polybenzazoles*, Ser. No. 547,650 (filed Jul. 2, 1990).

Harris et al., *Shaped Articles Containing Copolymers of Polybenzazoles*, Ser. No. 562,781 (filed Aug. 6, 1990).

Pierini et al., *Matrix Composites in Which the Matrix Contains Polybenzoxazole or Polybenzothiazole*, Ser. No. 624,164 (filed Dec. 7, 1990).

Sandor, *Polybenzimidazole (PBI) as a Matrix Resin Precursor for Carbon/Carbon Composites*, 22nd International SAMPE Technical Conference Proceedings at 647-657 (Nov. 6-8, 1990).

4 Encyclopedia Polymer Sci. & Eng., *Composites, Fabrication*, at 1-36 (J. Wiley & Sons 1986).

*Primary Examiner*—Paul R. Michl
*Assistant Examiner*—Edward Cain

[57] ABSTRACT

Fibers may be prepregged with a dope containing a thermoplastic polybenzazole block copolymer. The prepreg may be contacted with water or another nonsolvent to coagulate the polymer and form a matrix composite.

19 Claims, No Drawings

PREPREGS CONTAINING A FIBER AND A THERMOPLASTIC POLYBENZAZOLE COPOLYMER MATRIX

BACKGROUND OF THE INVENTION

This invention relates to matrix composites and processes for making them.

A fiber-reinforced composite, or matrix composite, is an article comprising a plurality of fibers (the reinforcement) embedded in a plastic (the matrix). Typically, the fibers give strength and/or stiffness to the composite, and the matrix maintains fiber alignment and transfers load around broken fibers. Matrix composites are described in detail in numerous references, such as Kirk-Othmer Ency. Chem., Tech. - Supp., *Composites, High Performance*, at 260-281 (J. Wiley & Sons 1984).

A number of fibers are available for use in matrix composites, each having different combinations of tensile and compressive strength and modulus, temperature stability, creep, cost, and other properties. Suitable fibers may contain, for example, aramid (such as Kevlar TM fibers), boron, glass, carbon, gel-spun polyethylenes (such as Spectra TM fiber), polybenzoxazole, polybenzothiazole, or polybenzimidazole. Suitable fibers and processes for their fabrication are described in numerous references, such as U.S. Pat. No. 4,533,693; 3 Kirk-Othmer Ency. Chem. Tech., *Aramid Fibers*, 213 (J. Wiley & Sons 1978); Kirk-Othmer Ency. Chem , Tech. - Supp., *Composites, High Performance*, at 261-263: 11 Ency. Poly. Sci. & Eng., *Polybenzothiazoles and Polybenzoxazoles*, 601 (J. Wiley & Sons 1988) and W. W. Adams et al., *The Materials Science and Engineering of Rigid-Rod Polymers*, at 245-312 (Materials Research Society 1989).

A number of matrix materials are also available for use in matrix composites. Some matrix materials are thermosetting resins, such as polyesters, epoxy resins, polycyanates, polybutadienes, vinyl ester resins, polyimides, and even carbon. Some matrix materials are thermoplastic, so that the resulting matrix composite may be shaped at a temperature above the processing temperature of the matrix.

There is a need for improved thermoplastic matrix materials in matrix composites. In particular, a matrix having a higher tensile strength and modulus would improve those same physical properties in the matrix composite as a whole. What is needed is a prepreg in which the fiber is impregnated with an improved thermoplastic matrix resin.

SUMMARY OF THE INVENTION

One aspect of the present invention is a prepreg comprising:
  (1) one or more fibers oriented in essentially the same direction: and
  (2) a dope impregnating the fibers that contains: (a) a thermoplastic polybenzazole block copolymer in a quantity sufficient to bind the fibers together and (b) a solvent for the polybenzazole block copolymer.

A second aspect of the present invention is a process for synthesizing a fiber-reinforced composite, said process comprising the steps of:
  (1) prepregging a plurality of fibers with a dope that contains: (i) a polybenzazole block copolymer, and (ii) a solvent for the block copolymer:
  (2) laying up one or more prepregs from step (1) in one or more selected orientations; and
  (3) contacting the prepregs with a liquid that causes the polymer or copolymer to coagulate, in a quantity sufficient to cause the polymer or copolymer to coagulate with the fibers embedded therein.

The process and prepregs of the present invention can be used to synthesize composites in which the matrix is a thermoplastic polybenzazole block copolymer. The composites may be thermoformed, and their tensile strength and modulus is ordinarily higher than the tensile strength and modulus of analogous composites that do not contain the block copolymer. Composites of the present invention and shaped articles containing them are useful for structural materials and parts.

DETAILED DESCRIPTION OF THE INVENTION

The present invention uses fibers, such as those previously described. The fibers should be a type whose properties are not substantially degraded by contact with the solution of block copolymer and its solvent. The fiber is preferably aramid, carbon, polybenzoxazole or polybenzothiazole. It is most preferably carbon or polybenzoxazole. Polybenzoxazole and polybenzothiazole fibers are preferably heat treated. The tensile strength of the fiber is preferably at least about 2.5 GPa, more preferably at least about 3.0 GPa and most preferably at least about 3.5 GPa. The tensile modulus of the fiber is preferably at least about 135 GPa, more preferably at least about 200 GPa and most preferably at least about 270 GPa.

The fibers may have dimensions that are usual for reinforcing materials in matrix composites. Their average diameter is preferably no more than about 40 $\mu$ and more preferably no more than about 20 p. The fiber may be, for instance, in the form of a cloth or in the form of long strands or in the form of a short fiber or fiber pulp suitable for making random fiber composites. A mixture of fibers may be used. For instance, the fibers may contain a mixture of at least one fiber having high tensile properties, such as aramid or polybenzazole, and another fiber having high compressive properties, such as quartz.

The present invention also uses a dope containing thermoplastic polybenzazole block copolymers to form a matrix. The following references, which are incorporated herein by reference, describe some examples of suitable thermoplastic polybenzazole block copolymers; some processes to make those block copolymers and also some matrix composites made by a different process in which the block copolymers are the matrix material Harris et al., Ser. No. 327,925 (filed Mar. 23, 1989); Harris et al., Ser. No. 407,973 (filed Sep. 15, 1989): Harris et al., Ser. No. 327,926 (filed Mar. 23, 1989): and Hwang et al., Ser. No. 547,650 (filed Jul. 2, 1990).

Block copolymers used in the present invention preferably contain one or more blocks of rigid or semi-rigid polybenzazole polymer. The rigid or semi-rigid polymer contains AB-mer units, as represented in Formula 1(a), and/or AA/BB-mer units, as represented in Formula 1(b)

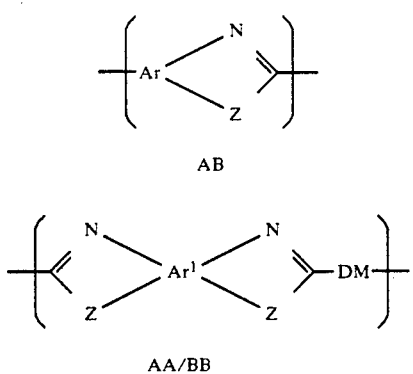

AB

AA/BB

1(a)

1(b)

wherein:

Each Ar represents an aromatic group. The aromatic group may be heterocyclic, such as a pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bis-phenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.

Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (Ar) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans-position with respect to each other, as illustrated in 11 Ency. Poly. Sci. & Eng., supra. at 602, which is incorporated herein by reference.

The rigid or semi-rigid polymer preferably consists essentially of either AB-PBZ mer units or AA/BB-PBZ mer units, and more preferably consists essentially of AA/BB-PBZ mer units. It is preferably a rigid rod AA/BB-PBZ polymer. Azole rings within the polymer are preferably oxazole rings (Z=O) or thiazole rings (Z=S), and are more preferably oxazole rings. Preferred mer units are illustrated in Formulae 2 (a) –(g). The rigid or semi-rigid polymer more preferably consists essentially of mer units selected from those illustrated in 2(a)–(g), and most preferably consists essentially of a number of identical units selected from those illustrated in 2(a)–(c).

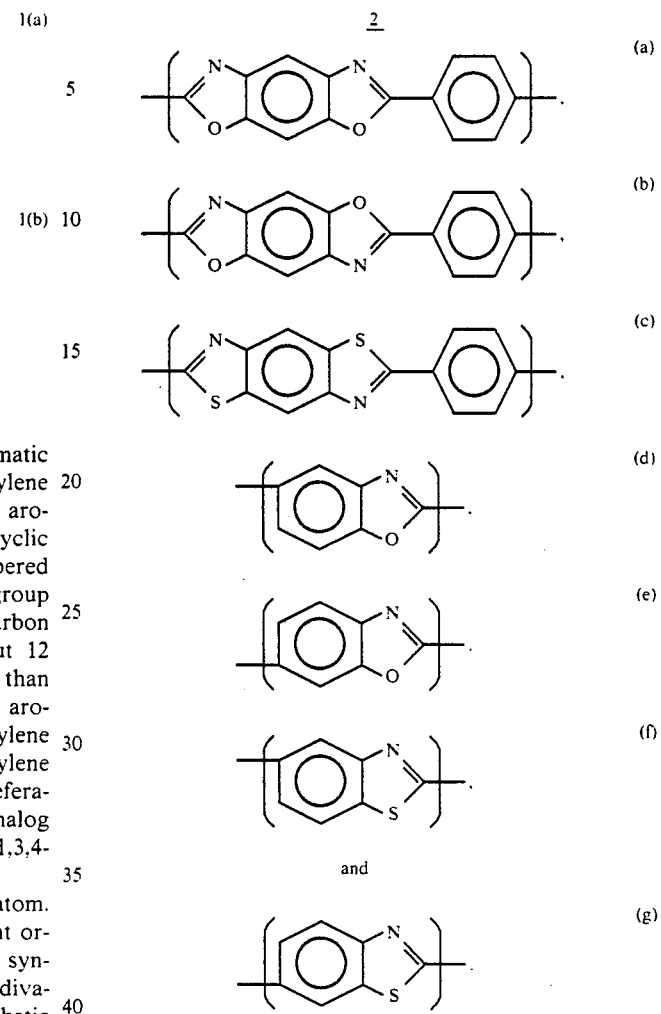

2

Blocks of rigid or semi-rigid polymer preferably contain on average at least about 5 mer units and more preferably at least about 8 mer units. The blocks preferably contain on average no more than about 100 mer units, more preferably no more than about 50 mer units and most preferably no more than about 25 mer units. Polymer in the rigid or semi-rigid block is ordinarily not thermoplastic.

The block copolymers also contain at least one block of thermoplastic polymer. Examples of suitable thermoplastic polymer include some polyamides, some polyimides, some polyquinoxalines, some polyquinolines, poly(aromatic ether ketones and sulfones) and some copolymers of those polymers. The best copolymer will depend upon the desired properties of the block copolymer. Polyamides and polybenzazoles containing aliphatic groups tend to have lower glass transition temperatures. Poly(aromatic ether ketones and sulfones) ordinarily have moderate glass transition temperatures and good solvent resistance. Other exemplary polymers frequently have high glass transition temperatures and good thermal stability. The thermoplastic polymer is preferably soluble in methanesulfonic acid and/or polyphosphoric acid, and can more preferably be synthesized in methanesulfonic acid and/or polyphosphoric acid.

The thermoplastic blocks preferably have an average molecular weight of at least about 800. The preferably comprise at least about 10 mer units, more preferably at least about 25 mer units. The preferred weight ratio of rigid or semi-rigid polymer to thermoplastic varies depending upon the desired use of the polymer. The rigid or semi-rigid blocks and the thermoplastic blocks preferably each make up at least about 5 weight percent of the block copolymer, more preferably at least about 10 weight percent of the block copolymer, and most preferably at least about 25 weight percent of the block copolymer.

The block copolymer is dissolved in a solvent to form a solution or dope. Some polybenzoxazole and polybenzothiazole polymers are soluble in cresol, but the solvent is preferably an acid capable of dissolving the polymer. The acid is preferably non-oxidizing. Examples of suitable acids include polyphosphoric acid, methanesulfonic acid and sulfuric acid and mixtures of those acids. The acid is preferably polyphosphoric acid and/or methanesulfonic acid, and is more preferably polyphosphoric acid. The fiber should be chosen so that its properties do not degrade upon contact with the acid.

The dope should contain a high enough concentration of polymer for the polymer to coagulate to form a solid article. The concentration of polymer in the dope is preferably low enough so that the dope is not liquid crystalline. It is preferably low enough that polymer coagulated from the dope is at least about planar isotropic, is more preferably isotropic in three dimensions, and is most preferably not optically phase separated. Optimum concentration varies as a function of the rigidity and quantity of rigid or semi-rigid portions in the block copolymer. When the block copolymer contains rigid rod polybenzoxazole or polybenzothiazole segments, those segments preferably make up less than about 7 weight percent of the solution, more preferably no more than about about 5 weight percent and most preferably no more than about 3 weight percent. The concentration of the polymer in the solution is preferably at least about 0.5 weight percent and more preferably at least about 1 weight percent.

Suitable block copolymers can be synthesized by known procedures, such as those described in the previously cited references. Ordinarily, the rigid rod segment is synthesized with active end groups. Then either (1) it is reacted with previously synthesized thermoplastic segments having compatible active end groups: or (2) it is reacted with monomers that can both react with each other to form a polymer and react with the active end group to link that polymer with the rigid polymer.

The fiber is prepregged with the dope. The optimum procedure for prepregging the fiber in the dope will vary depending upon the fiber, the dope and the desired composite. A less viscous dope, whose viscosity is similar to that of other uncured matrix resins, may be prepregged according to processes used for known matrix resins, such as spraying or immersion. Likewise, a fiber or fiber tow or a group of tows may be prepregged with a viscous dope by known means for putting viscous coatings on fibers or wires, such as by extruding the dope on the fiber using a cross-head die.

Such processes ordinarily form a prepregged tape that can be laid up in a desired orientation and shape. Many different fiber configurations are known and may be used. The fibers may run in a single direction to form a unidirectional composite, having great strength in one direction but poorer properties in other directions. The fibers may be laid out in layers directed at different angles with respect to each other to form a multidirectional composite. The prepreg may be laid out flat or filament wound to form a shaped article.

A group of fibers or tows may be prepregged with a dope that is viscous enough to form a film, by forming one or more dope films and either pressing the fibers into a single film of dope or pressing the fibers between two films of dope. Several alternating layers of fiber and dope film may be pressed together to form a composite having several layers of fiber. The fibers pressed into the dope may have unidirectional or multidirectional orientation as previously described. They may be part of a cloth or a non-woven mat. The dope film may be thicker to form a "resin-rich" composite or thinner to form a "resin-starved" composite. The dope film is preferably on average at least about 25 pm thick. The temperature should be high enough for the fibers to embed in the dope and for the dope sheets to consolidate.

The film may be uniaxially stretched to provide best properties in a single direction, but it is preferably biaxially stretched to provide good properties in at least two directions. The extrusion of dopes to form films is described in numerous references, such as in Chenevey, U.S. Pat. No. 4,487,735 (Dec. 11, 1984); Lusignea et al., U.S. Pat. No. 4,871,595 (Oct. 3, 1989); Chenevey, U.S. Pat. No. 4,898,924 (Feb. 6, 1990); Harvey et al., U.S. Pat. No. 4,939,235 (Jul. 3, 1990) Harvey et al., U.S. Pat. No. 4,963,428 (Oct. 16, 1990): and Lusignea et al., U.S. Pat. No. 4,966,806 (Oct. 30, 1990), which are incorporated herein by reference. For instance, the dope may be extruded from a slit die, after which it is preferably mechanically stretched before coagulation to impart biaxial orientation. Alternatively, the dope may be extruded in a tubular film that is preferably stretched biaxially by a bubble process to impart biaxial orientation.

The fibers may be short fibers or fiber pulps that are immersed in the dope to form a random fiber composite, similar to those described in U.S. Pat. Nos. 4,426,470 and 4,550,131, which are incorporated herein by reference.

After prepregging is accomplished and the prepregs are laid up in the desired shape and configuration, the composite is hardened by contacting the dope with a liquid that causes the block copolymer to coagulate. Ordinarily, the liquid is a nonsolvent for the block copolymer. Many nonsolvent liquids have been studied and their effects on polybenzazole coagulation reported. The nonsolvent liquid may be an organic compound, such as an alcohol or a ketone containing no more than about 4 carbon atoms. The nonsolvent liquid is preferably aqueous, and more preferably consists essentially of water, at least at the commencement of the coagulation. When the solvent is volatile or contains a volatile component, then the volatile component can be at least partially removed by evaporation to concentrate the polymer before coagulation.

The coagulated polymer is preferably Washed for a period of time sufficient to remove substantially all of the remaining solvent and solvent residuals. The composite may be dried. It is preferably restrained from shrinking as it is dried. After drying, the composite may be heat treated. Heat treatment is preferably carried out under tension. The finished composite may be machined into a desired final shape.

The resulting composite has fibers as previously described embedded in a matrix resin containing a polybenzoxazole or polybenzothiazole block copolymer as previously described. The composite should contain a sufficient number of fibers to provide reinforcement for the composite. It should contain a sufficient quantity of matrix material to hold the fibers together and maintain fiber alignment, and preferably to transfer loads around broken fibers.

The composite preferably contains at least about 20 volume percent fiber, more preferably at least about 40 volume percent fiber and most preferably at least about 50 volume percent fiber. It preferably contains at least about 20 volume percent matrix and more preferably at least about 35 volume percent matrix.

Several variations on the basic composite are possible. For instance, the fiber may receive surface treatment or be coated with an adhesive to improve the adhesion of the fiber to the matrix. The matrix may contain a mixture of more than one polymer, such as several polybenzazole polymers or a mixture of the polybenzazole fiber and a non-polybenzazole polymer, as described in Uy, U.S. Pat. No. 4,810,735 (Mar. 7, 1989), which is incorporated herein by reference. The matrix preferably contains only a single block copolymer. The fiber may be wrapped with another fiber to improve compressive strength, as described in U.S. Pat. No. 4,499,716 and in Ledbetter, Ser. No. 564,480 (filed Aug. 8, 1990), which are incorporated herein by reference.

The preferred block copolymer matrix resins are thermoplastic. Their tensile strength and/or tensile modulus is preferably higher than the tensile strength of the thermoplastic polymer, if it were not part of the block copolymer. Some have good solvent resistance, good chemical resistance and high continuous use temperatures. The composite may be fabricated into structural parts for many known uses.

ILLUSTRATIVE EXAMPLES

The following examples are given to illustrate the invention and should not be interpreted as limiting the Specification or the claims. Unless stated otherwise, all parts and percentages are given by weight.

EXAMPLE 1

Composite Containing Carbon Fiber and Polybenzoxazole/PEEK-PBO Block Copolymer Matrix A composite is fabricated by the following procedure using (1) a graphite fiber and (2) a dope containing a mixture of methanesulfonic acid and polyphosphoric acid and about 3 weight percent of a block copolymer having rigid rod cis-polybenzoxazole blocks and blocks of thermoplastic cis-PBO/PEEK copolymer. The block copolymer contains about 38 weight percent rigid rod block and about 62 weight percent thermoplastic block. Its average structure is represented by the Formula:

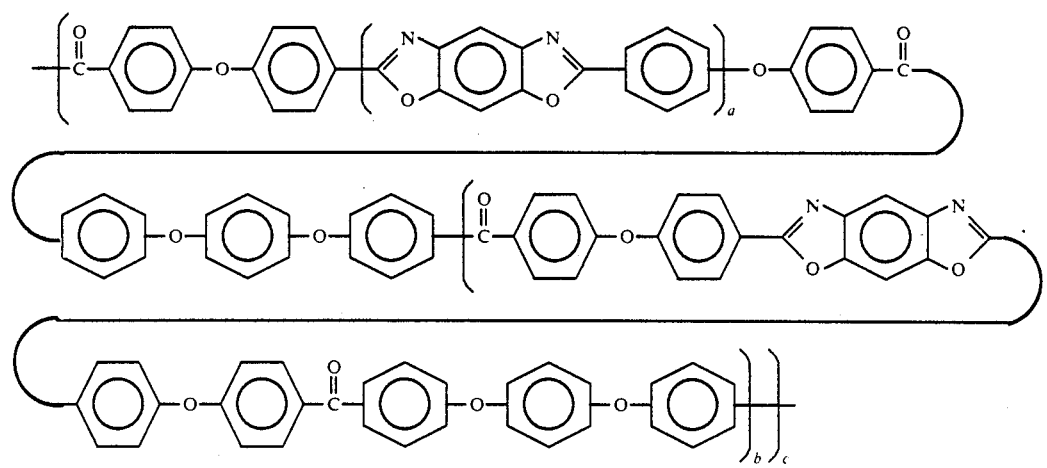

wherein "a", "b" and "c" are each a number of mer units suitable to provide the desired proportions of polymer.

The fiber is passed through a 400° C. oven at a rate of 140 in./min. in order to remove the sizing on the fiber. The fiber passes through several idler rollers and through a resin bath that contains the dope at room temperature. The impregnated fiber passes through a rectangular die 0.120 in.×0.008 in. to clean off excess dope.

The prepreg is wound around a rotating 70 in. drum such that each wrap is immediately adjacent to the previous wrap without overlapping. The prepreg is cut into seven 7 in.×7 in. panels, which are stacked to form a seven-ply unidirectional laminate. The laminate is placed in a porous Teflon TM fluoropolymer bag, clamped between perforated aluminum plates and immersed in running water at room temperature for 24 hours.

The resulting wet composite is pressed at 80° C. and 100 psi for 4½ hours and is placed in a vacuum oven at 90° C. for 24 hours to dry. It is then compressed for 6 minutes at 400° C. and 50 psi, for 15 minutes at 400° C. and 1000 psi, and for a time sufficient to cool at 1000 psi to consolidate. The resulting composite is rigid with individual plies bonded firmly together.

What is claimed is:

1. A prepreg comprising:
   (1) one or more fibers oriented in essentially the same direction; and
   (2) a dope impregnating the fibers that contains (a) a thermoplastic polybenzazole block copolymer in a quantity sufficient to bind the fibers together; and (b) a solvent for the polybenzazole block copolymer.

2. The prepreg of claim 1 wherein the solvent is an acid.

3. The prepreg of claim 2 wherein the block copolymer contains at least one rigid or semi-rigid polybenzazole block and at least one thermoplastic block.

4. The prepreg of claim 3 wherein polybenzazole mer units in the block copolymer are polybenzoxazole and/or polybenzothiazole mer units.

5. The prepreg of claim 4 wherein the rigid or semi-rigid block consists essentially of mer units represented by one of the Formulae:

(a) 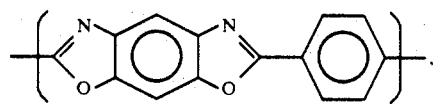

(b) 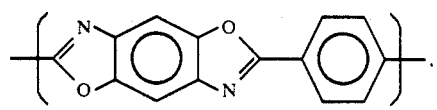

(c) 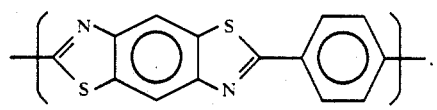

(d) 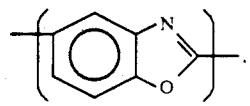

(e) 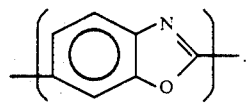

(f) 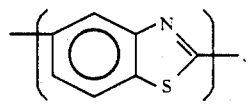

and (g) 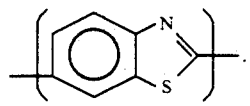

6. The prepreg of claim 4 wherein the thermoplastic block of the block copolymer is a thermoplastic polybenzazole, polyamide, polyimides, polyquinoxalines, polyquinolines, poly(aromatic ether ketones and sulfones) or a copolymer thereof.

7. The prepreg of claim 4 wherein the thermoplastic block of the block copolymer is a thermoplastic polybenzazole polymer or copolymer.

8. The prepreg of claim 4 wherein the thermoplastic block of the block copolymer is a thermoplastic polyamide polymer or copolymer.

9. The prepreg of claim 4 wherein the thermoplastic block of the block copolymer is a thermoplastic poly(aromatic ether ketone or sulfone) polymer or copolymer.

10. The prepreg of claim 4 wherein the thermoplastic block of the block copolymer and the rigid or semi-rigid block of the block copolymer each make up at least about 5 weight percent of the block copolymer.

11. The prepreg of claim 10 wherein the thermoplastic block of the block copolymer makes up at least about 25 weight percent of the block copolymer.

12. The prepreg of claim 4 wherein the concentration of block copolymer in the dope is low enough that the dope is not liquid crystalline.

13. The prepreg of claim 4 wherein the concentration of block copolymer in the dope is less than 7 weight percent.

14. The prepreg of claim 4 wherein the fiber is an aramid, boron, glass, carbon, gel-spun polyethylene, polybenzoxazole, polybenzothiazole, or polybenzimidazole fiber.

15. The prepreg of claim 4 wherein the solvent contains methanesulfonic acid and/or polyphosphoric acid.

16. A process for synthesizing a fiber-reinforced composite, said process comprising the steps of:
 (1) prepregging a plurality of fibers with a dope that contains: (i) a polybenzazole block copolymer, and (ii) a solvent for the block copolymer;
 (2) laying up one or more prepregs from step (1) in a selected orientation; and
 (3) contacting the prepregs with a liquid that causes the polymer or copolymer to coagulate, in a quantity sufficient to cause the polymer or copolymer to coagulate with the fibers embedded therein.

17. The process of claim 16 wherein (1) the solvent is an acid; (2) the block copolymer contains at least one rigid or semi-rigid polybenzoxazole and/or polybenzothiazole block; and (3) the block copolymer contains at least one thermoplastic block that contains a thermoplastic polybenzazole, polyamide, polyimide, polyquinoxaline, polyquinoline, poly(aromatic ether ketone or sulfone) or a copolymer thereof.

18. The process of claim 17 wherein the dope is not liquid crystalline.

19. The process of claim 18 wherein the liquid used to coagulate the block copolymer is aqueous.

* * * * *